United States Patent [19]

Park

[11] Patent Number: 5,606,431
[45] Date of Patent: Feb. 25, 1997

[54] VIDEO PRINTER

[75] Inventor: Geun-Yong Park, Suwon, Rep. of Korea

[73] Assignee: Samsung Electronics Co., Ltd., Kyungki-do, Rep. of Korea

[21] Appl. No.: 143,641

[22] Filed: Nov. 1, 1993

[30]     Foreign Application Priority Data

Oct. 30, 1992 [KR]  Rep. of Korea .................. 92-20106

[51] Int. Cl.⁶ .................. H04N 1/46; H04N 9/74
[52] U.S. Cl. .............. 358/503; 358/515; 358/540; 358/539; 348/589
[58] Field of Search .................. 358/400, 404, 358/401, 450, 452, 462, 467, 479, 500, 501, 515, 502, 503, 540, 539, 523, 522, 524, 448, 453, 537, 538; 355/20, 40; 345/116; 348/564, 589, 563, 569, 458, 598, 600, 239, 232; 395/161

[56]            References Cited

U.S. PATENT DOCUMENTS

| 4,255,766 | 3/1981 | Matsuda et al. | 348/564 |
|---|---|---|---|
| 4,701,804 | 10/1987 | Toyoda et al. | 358/444 |
| 4,786,944 | 11/1988 | Sakamoto et al. | 355/20 |
| 4,821,102 | 4/1989 | Ichikawa et al. | 348/589 |
| 4,876,567 | 10/1989 | Yamaguchi et al. | 355/20 |
| 4,896,186 | 1/1990 | Tokuda | 355/40 |
| 4,896,222 | 1/1990 | Fukai | 358/446 |
| 5,042,078 | 8/1991 | Oshikoshi et al. | 382/54 |
| 5,253,082 | 10/1993 | Hayashi et al. | 358/515 |
| 5,298,995 | 3/1994 | Monta et al. | 348/458 |
| 5,392,069 | 2/1995 | Koyama et al. | 348/586 |

Primary Examiner—Edward L. Coles, Sr.
Assistant Examiner—Jerome Grant, II
Attorney, Agent, or Firm—Sughrue, Mion, Zinn, Macpeak & Seas

[57]            ABSTRACT

A video printer includes a control circuit for outputting an image signal to the printing mechanism from a first memory so that the image signal is printed in a central effective image area. The control circuit also outputs index information (for example, the date or title) to the printing mechanism from a second memory so that the index information is printed in a margin area outside of the central effective area.

13 Claims, 3 Drawing Sheets

VIDEO PRINTER

BACKGROUND OF THE INVENTION

1. Field of the Invention

The present invention relates to a video printer, and more particularly to a video printer which records information of pictorial images to be printed out from a sublimating heat transfer video printer on a marginal space, so that loss of images can be prevented.

2. Description of the Prior Art

A video printer is generally an apparatus for printing pictorial images broadcast from a TV station or filmed by a video camera on recording paper, and as a representative example for such a video printer, there can be found a sublimating heat transfer video printer.

The sublimating heat transfer video printer sublimates dyes of three (3) colors (yellow, magenta and cyan) coated on a ribbon 10 as shown in FIG. 3 by utilizing heat generated from a thermal print head according to the image information, thereby transferring the same on the recording paper, so that the pictorial images can be recorded on the recording paper.

FIG. 4 is a plan view for explaining a heating element of the thermal print head used by a conventional video printer where length L of the heating element 12 in the thermal print head is generally almost the same as a drum width of the ribbon 10 in the printer.

However, certain predetermined parts d on both sides of the heating element 12 are not actually driven (heated) during the recording of the images and only a part L1 other than the predetermined parts d on both sides of the heating element 12 are driven to thereby print the images on the recording paper.

Accordingly, there are cases when a user separately inputs index information of the images before printing and prints after creating this index information on the produced print.

In other words, a date, place and the like are indicated on one portion of the image by way of an editing apparatus having a separate On Screen Display OSD function, which are printed along with the image.

In other words, part of the image is deleted and the image information is shown on a place where the part of the image is deleted or the image information is overlappingly superimposed with the pictorial images.

By way of example, if "May 27, 1992" is input as image information, the recording paper 14 will have the pictorial image along with the image information of "May 27, 1992" printed thereon as illustrated in FIG. 5.

At the same time, predetermined widths (L2, L3) (C2, C3) of marginal spaces are generated on upper, lower, left and right sides of the recording paper 14, and the image inclusive of the image information (e.g., the recording date) is recorded on a predetermined central area (L1×C1).

However, as seen from the foregoing, the conventional printer thus described has a drawback in that the image information (e.g., the recording date) is overlapped with the pictorial images, or a predetermined part of the images are deleted even though sizable areas of marginal space are available.

SUMMARY OF THE INVENTION

Accordingly, the present invention has been presented to solve the aforementioned problem and it is an object of the present invention to record an image information on an upper or lower marginal space as to prevent part of the actual image from being deleted or shrouded by the image information.

In order to attain the aforementioned goal, according to the present invention, the video printer has: an image signal memory means for receiving an external image signal to thereby memorize the same; an editing means for editing an index signal; an index information memory means for receiving the index signal from the editing means to thereby memorize the same; a printing means for receiving a signal from the image signal memory means and index information memory means to thereby print the image corresponding thereof on a recording paper; and a control means for controlling an output of the image signal memory means to thereby be made within an effective image area of the recording paper where the image is printed and for controlling an output of the index information memory means to thereby be made on the marginal space of the recording paper.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Hereinafter, a video printer constructed according to the present invention will be described in detail with reference to the accompanying drawings.

Figure 1:
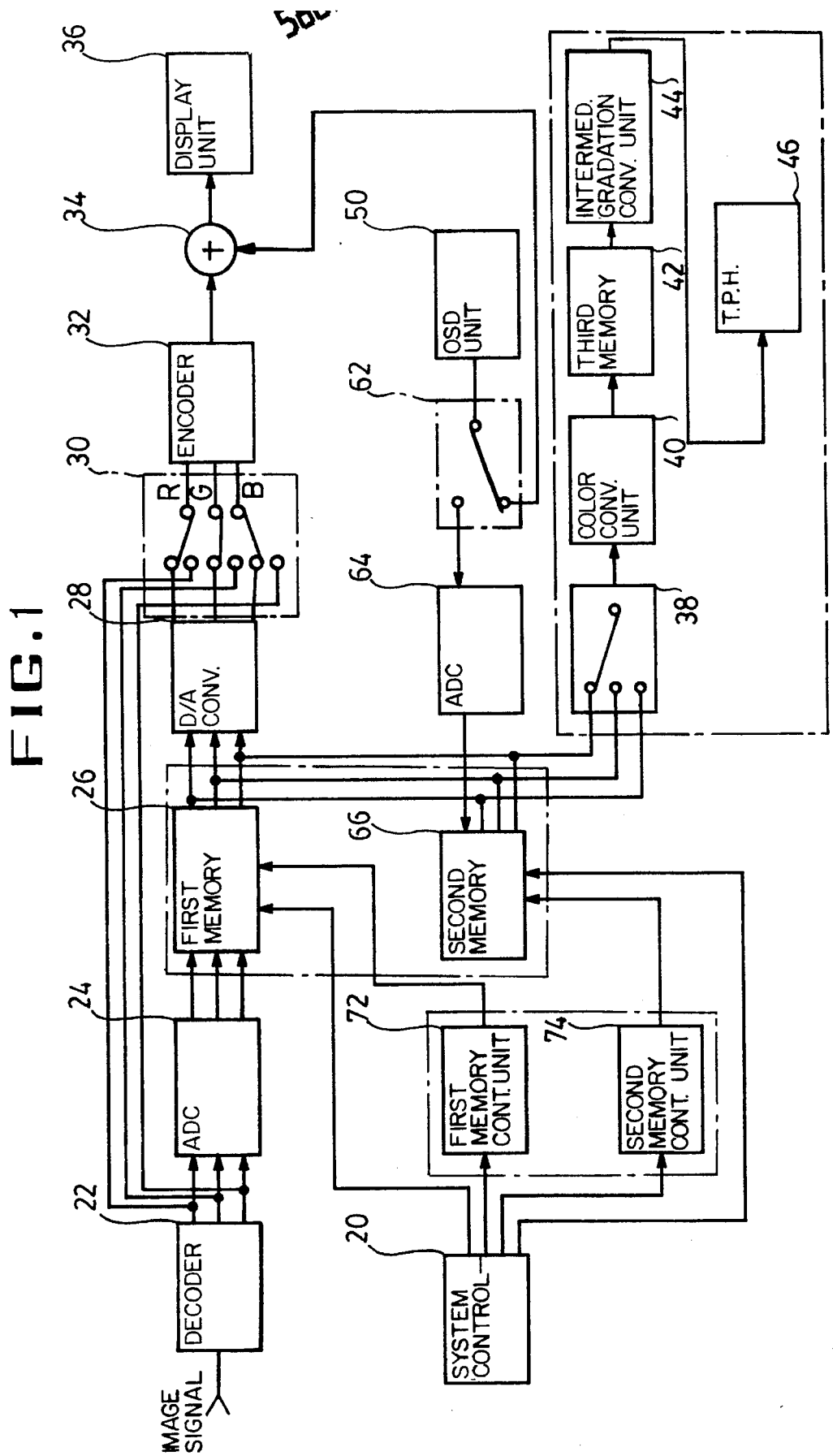
FIG. 1 is a block diagram for illustrating a circuit of a video printer according to the present invention.

FIG. 1 is a block diagram for illustrating a construction of a video printer according to the present invention, having: an image signal memory means for receiving an external image signal; an editing circuit for outputting an index signal; an index information memory for receiving the index signal from the editing circuit; a printing circuit for receiving a signal from the image signal memory and index information memory to thereby print the image corresponding thereof on a recording paper; and a control circuit for controlling an output of the image signal memory to thereby be made within an effective image area of the recording paper where the image is printed and for controlling an output of the index information memory to thereby be made on the marginal space of the recording paper.

The image signal memory has: a decoder 22 for separating an image signal inputted from a signal input source into a chrominance signal of red R, green G and blue B; an Analog-to-Digital Converter ADC 24 for converting the chrominance signal of red, green and blue colors outputted in analog from the decoder 22 to a digital signal; and a first memory 26 for storing the digital chrominance signal of red, green and blue colors outputted from the ADC 24 to thereafter output the same.

The editing circuit has: An OSD unit 50 for storing such information as dates, days of the week, and an illustrative sentence, to thereafter output the same at the user's option; and a third selection unit 62 controlled by a system controller (to be explained later) to selectively output an index information signal outputted from the OSD unit 50.

The index information memory: an ADC 64 for converting the index information signal output from the third selection unit 62 to a digital signal; and a second memory 66 for storing the image information signal converted to the digital signal at the ADC 64 to thereafter output the same to the marginal space where the image is not output to the printing circuit so that the image information can be printed on the marginal space of the recording paper.

The printing circuit has: a second selection unit 38 for selectively outputting the chrominance signal of red, green and blue colors outputted from the first memory 26 of the image signal memory means; a color conversion unit 40 for converting to a chrominance signal (yellow, magenta and cyan) having a relationship of complementary color to the chrominance signal of blue, green and red colors selectively outputted from the second selection unit 38; a third memory 42 for storing the output of the color conversion unit 40 to thereafter output the same; an intermediate gradation conversion unit 44 for comparing the output of the third memory 42 with a previously-established gradation value; and a thermal print head 46 for generating heat according to the output from a result of the comparative result of the intermediate gradation conversion unit 44 to thereby sublimate the dyes coated on the ribbon, so that the image can be recorded on the recording paper.

The control circuit has: a system controller 20 for controlling read/write operations of the first and second memories 26 and 66; and first and second memory control units 72 and 74 for being controlled by the system controller 20 and for designating addresses of the first and second memories 26 and 66.

Of course, the first and second memory control units 72 and 74, and the first and second memories 26 and 66 can be composed of one memory control unit and one memory respectively.

Meanwhile, the video signal and index information can be viewed by way of a display circuit by the user.

The display circuit mentioned above has: a Digital-to-Analog Converter DAC 28 for converting the digital chrominance signal of red, green and blue colors outputted from the first memory 26 of the image signal memory to an analog signal to thereafter output the same; a first selection unit 30, controlled by the system controller 20 for selectively outputting the output of the decoder 22 or DAC 28; an encoder 32 for converting the analog chrominance signal or red, green and blue colors selectively outputted from the first selection unit 30 a composite video signal; a mixing unit 34 for mixing the output of the encoder 32 with the video information signal outputted from the editing circuit; and a display unit 36 for displaying the video signal and index information outputted from the mixing unit 34.

Operations of the video printer thus constructed according to the present invention will be described in detail with reference to the accompanying drawing of FIG. 1.

First of all, when the user turns on the electric power of the display unit 36 of the video printer or a TV monitor, the composite video signal input from a signal input source such as a camcorder (video camera) or a television through the decoder 22 is separated into a luminance signal and a chrominance signal comprising red, green and blue signals.

The chrominance signals of red, green and blue separated from the decoder 22 is selected by the first selection unit 30 to thereafter be inputted to the encoder 32.

The encoder 32 converts the chrominance signals of red, green and blue colors selectively outputted from the first selection unit 30 as a composite video signal to thereafter output the same.

The composite video signal output by the encoder 32 is outputted to the display unit 36 through the mixing unit 34.

The display unit 36 reproduces the image according to the composite video signal output by the mixing unit 34.

Meanwhile, when the user presses a memory switch, while watching the image reproduced by the display unit 36 while a screen to be printed is produced, the chrominance signal of red, green and blue separated by the decoder 22 is converted to a digital signal at the ADC 24. The chrominance signal converted to the digital signal at the ADC 24 is controlled by the system controller 20 and the first memory control unit 72 to thereafter be stored at the first memory 26.

In other words, when the user presses the memory switch, while watching the image reproduced through the display unit 36 when the scene to be printed appears, the system controller 20 performs a control operation, so that the first memory 26 can perform the write operation.

Furthermore, the system controller 20 activates the first memory control unit 72 to thereby generate an address, so that the image of one frame (one screen) converted to the digital signal at the ADC 24 is stored in the first memory 26.

Under these circumstances, the first selection unit 30 causes the decoder 22 and encoder to be connected, so that an external video signal keeps being reproduced.

When the user presses a confirming switch in order to confirm the memorized scene, the first memory 26 performs a read operation by way of the system controller 20 and the first memory control unit 72, so that the first selection unit 30 is switched by control of the system controller 20 to thereby connect the DAC 28 with the encoder 32.

Accordingly, data read by the first memory 26 is converted to an analog signal at the DAC 28, and is input to the encoder 32 through the first selection unit 30.

The encoder 32 converts the incoming chrominance signal of red, green, and blue to a composite video signal to thereafter output the same.

The composite video signal output by the encoder 32 is output to the display unit 36 through the mixing unit 34.

As seen from the foregoing, the display unit 36 reproduces the pictorial image recorded at the first memory 26 according to the composite video signal outputted from the mixing unit 34.

If the index switch is pressed to add index information such as dates and days of the week and the like on the pictorial image reproduced on the display unit 36, the third selection unit 62 is switched by the system controller 20 to thereby connect the mixing unit 34 to the OSD unit 50.

When the image information is input by way of the OSD unit 50, the OSD unit 50 generates characters or symbols and the like according to the information input by the user to thereafter output the same to the mixing unit 34.

The mixing unit 34 mixes the composite video signal output from the encoder 32 with the information generated from the OSD unit 50 to thereafter output the same.

The display unit 36 is caused to reproduce the image, characters or the like on a predetermined position of the screen according to the signal outputted from the mixing unit 34 and the user can select the character, symbol and the like according to a menu.

When the user wants to store the character, symbol or the like to the second memory 66 under a state that the image and character or the symbol and the like are reproduced on the display unit 36, the third selection unit 62 is switched under control of the system controller 20 to thereafter connect the OSD unit 50 to the ADC 64.

Accordingly, such video information such as the character, symbol and the like generated from the OSD unit 50 is converted to a digital signal at the ADC, thereafter being stored in the second memory 66.

At this moment, the second memory 66 performs a write operation under the control of the system controller 20 and at the same time, can record the information according to the address generated from the second memory control unit 74 controlled by the system controller 20.

Then, when the user presses a print swith in order to print the video image, character or symbol and the like currently stored in the first and second memories 26 and 66, the chrominance signal of red, green and blue is read from the first and second memories 26 and 66 to thereafter be output to the second selection unit 38.

At this point, the system controller 20 performs a control operation so that the first and second memories 26 and 66 can perform the read operation and at the same time controls the first and second memory control unit 72 and 74 to thereby read the signal stored in the first memory 26, and then causes the signal stored in the second memory 66 to be read later.

The second selection unit 38 is controlled by the system controller 20 and first selects the blue data to thereafter output the same to the color conversion unit 40.

The color conversion unit 40 converts the blue color outputted from the second selection unit 38 to the yellow chrominance signal which is in a complementary relation with the blue color, to thereafter output the same.

The third memory 42 stores per line the chrominance signal output by the color conversion unit 40 to thereafter read and output the same.

The intermediate gradation conversion unit 44 compares the output of the third memory 42 with a predetermined gradation value and outputs a Pulse Width Modulation PWM signal corresponding to a heating time per gradation.

The thermal print head 46 generates heat according to the comparative result of the intermediate gradation conversion unit 44 to thereby sublimate the dyes (yellow) coated on the ribbon, so that the video image and index information can be recorded on a video image domain and marginal space domain of the recording paper.

When the recording of yellow is completed, the second selection unit 38 is controlled by the system controller 20 to thereafter selectively output the green data.

The green signal selectively output by the second selection unit 38 is converted to a magenta chrominance signal by the same operation as with the blue signal to thereby sublimate the dyes (magenta) coated on the ribbon by way of the thermal print head 46, so that the video image and index information are recorded on the recording paper.

The second selection unit 38 is controlled by the system controller 20 to thereby sublimate dyes of cyan corresponding to the red color, so that the video image and index information can be recorded on the recording paper and the video image corresponding to one screen can be printed.

Figure 2:
FIG. 2 is an embodiment printed according to FIG. 1.
Figure 3:
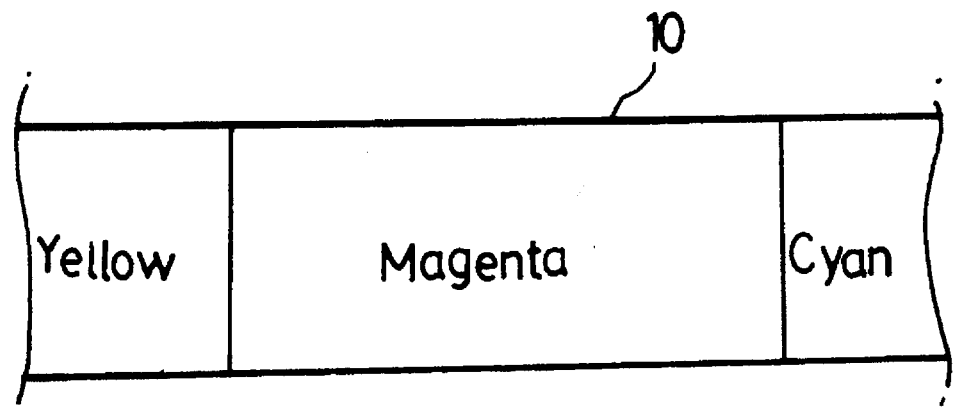
FIG. 3 is an embodiment of a ribbon used for a conventional video printer.
Figure 4:
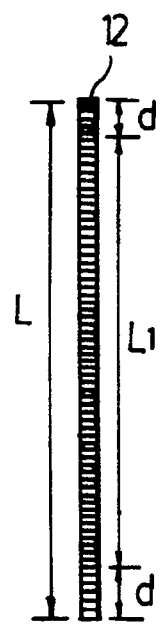
FIG. 4 is a plan view for explaining a heating element of a thermal print head used by the conventional video printer.
Figure 5:
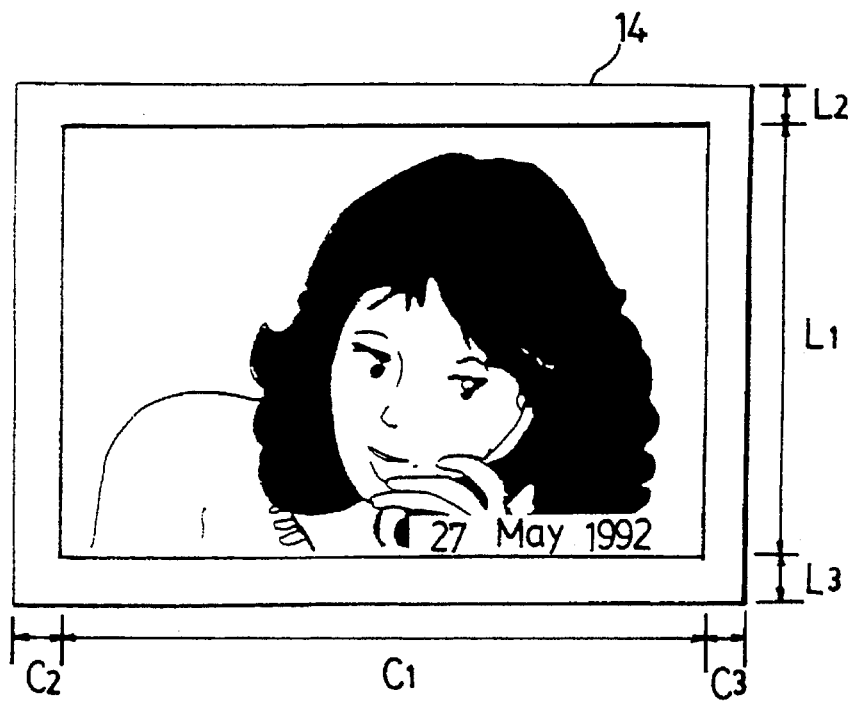
FIG. 5 is an embodiment of the recording paper printed according to a conventional technique.

Therefore, according to the video printer in accordance with the present invention, the video image information is output before the character, symbol and the like are outputted, to thereafter print the video image, and as seen in FIG. 2, the video image information input by the user is recorded on the marginal space located on the periphery of the video image.

Although the above describes a case where the video image information is first output while the character, symbol and the like are output later to thereby record the video image, it should be apparent that the character, symbol and the like can be first output while the video image information is output later to thereby perform the printing, so that the video image information input by the user can be recorded on an upper marginal space of the video image.

Furthermore, the user is allowed to select recording of the index information on either the upper or lower side of the marginal space.

As described above, the present invention can output the image information from a region where the video image is not output to the printing means to thereby print the video information on the marginal space, so that the video image information can be effectively recorded without loss or damage on the part of the video image.

The foregoing description and drawings are illustrative and are not to be taken as limiting. Still other variations and modifications are possible without departing from the spirit and scope of the present invention.

Specifically, the above description has only dealt with a heat transfer sublimating color printer but it also should be noted that the purpose of the present invention can be accomplished on all printers where a marginal space is generated on the recording paper during the printing operation.

Furthermore, although the present invention has described in detail the memory and the memory control unit, these can be conventionally increased or decreased in number.

Furthermore, although the present invention has illustrated a case where the system controller controls the memory and the memory control unit, it should also be apparent that the system controller can control each element of the printer not illustrated. In addition, although the present invention has only illustrated the indispensable elements, components of the video printer should not be limited to the aforementioned embodiment.

What is claimed is:

1. A video printer comprising:

image signal memory means for receiving an image signal to store the same;

editing means for editing an index signal;

index information memory means for receiving the index signal from the editing means to store the same;

printing means for receiving a signal from the image signal memory means and index information memory means to print an image corresponding to said image signal and said index signal on a recording medium; and control means for controlling an output of the image signal memory means to produce a first output within an effective image area of said recording medium and for controlling an output of the index information memory means to produce a second output on a marginal space of the recording medium, said marginal space not overlapping said effective image area.

2. A video printer as defined in claim 1 further comprising means for displaying a video image corresponding to at least one of: said image signal, an output of said image signal memory means, and an output of said editing means.

3. A video printer as defined in claim 1, wherein the image signal memory means comprises:

a decoder for separating said image signal into chrominance signals of red R, green G and blue B;

an Analog-to-Digital converter for converting the chrominance signals of red, green and blue output from the decoder into digital signals; and a chrominance memory for storing the digital chrominance signals of red, green and blue output from the Analog-to-Digital converter to thereafter output the same.

4. A video printer as defined in claim 1, wherein the editing means comprises:

an on-screen-display unit for storing at least one of a date, day of the week, and an illustrative sentence, to thereafter output the same based on a user input; and a selection unit, controlled by a system controller to selectively output an index information output from the on-screen display unit.

5. A video printer as defined in claim 4, wherein the index information memory means comprises:

an Analog-to-Digital converter for converting the index information output from the selection unit to a digital signal; and An index memory for storing the index information converted to the digital signal at the analog-to-digital converter to thereafter output the same.

6. A video printer as defined in claim 3, wherein the printing means comprises:

a selection unit for selectively outputting chrominance signals of red, green and blue output from the chrominance memory of the image signal memory means;

a color conversion unit for converting to chrominance signals of yellow, magenta and cyan having a complementary color relationship to the chrominance signals of blue, green and red selectively output from the selection unit;

a conversion memory for storing the output of the color conversion unit to thereafter output the same;

an intermediate gradation conversion unit for comparing the output of the conversion memory with a predetermined gradation value; and a thermal print head for generating heat according to the output of the intermediate gradation conversion unit to sublimate dyes coated on a ribbon, so that an image can be recorded on the recording medium.

7. A video printer as defined in claim 1, wherein the control means comprises:

a system controller for controlling read/write operations of the image signal memory means and the index information memory means; and first and a second memory control units, controlled by the system controller, for designating addresses of the image signal memory means and the index information memory means.

8. A video printer as defined in claim 1 further including a display means for displaying video signals corresponding to said image signal and said index signal.

9. A video printer as defined in claim 8, wherein the display means comprises:

a Digital-to-Analog converter for converting the chrominance signals of red, green and blue output from the image signal memory means to analog signals to thereafter output the same;

a selection unit for selectively outputting said image signal of an output of said Digital-to-Analog converter;

an encoder for converting chrominance signals of red, green and blue selectively output from the selection unit to a composite video signal;

a mixing unit for mixing the output of the encoder with information outputted from the editing means; and a display unit for displaying the output from the mixing unit.

10. An image printer comprising:

first receiving means for receiving an image signal;

second receiving means for receiving an index signal corresponding to said image signal;

a printing mechanism; and control means for outputting to said printing mechanism said image signal from said first receiving means so that said image signal is printed only in a central image area, and for outputting to said printing mechanism said index signal from said second receiving means so that said index signal is printed only in a margin area outside of said central image area.

11. The image printer of claim 10, wherein said index signal is generated by an on-screen display unit under the control of a user.

12. The image printer of claim 10, wherein said first and second receiving means are memory units.

13. The image printer of claim 12, wherein said control means controls addresses of said memory units.

* * * * *